Patented Mar. 21, 1933

1,902,005

UNITED STATES PATENT OFFICE

IRA WILLIAMS, OF WOODSTOWN, NEW JERSEY, AND ARTHUR MORRILL NEAL, OF WILMINGTON, DELAWARE, ASSIGNORS TO E. I. DU PONT DE NEMOURS & COMPANY, OF WILMINGTON, DELAWARE, A CORPORATION OF DELAWARE

PRESERVATION OF RUBBER

No Drawing.    Application filed March 12, 1932. Serial No. 598,538.

This invention relates to the preservation of rubber and more particularly to the incorporation of a new class of compounds in rubber which, when incorporated into the rubber, tend to retard or inhibit that deterioration which is due to the action of heat, light and oxygen.

It is well known that many materials when incorporated in rubber possess the property of retarding the deterioration which rubber normally undergoes when exposed to light, heat and air. Among the compounds which have been successfully employed for this purpose are certain organic nitrogen compounds such as the amines and more particularly the secondary aromatic amines. While compounds of this type are very effective for increasing the age-resisting properties of rubber, they have been found to be unsatisfactory for use in white and light colored rubber articles because the rubber containing them discolors very badly when exposed to sunlight.

An object of the present invention is to provide a new class of compounds for increasing the age-resisting properties of rubber. A further object is to provide a class of compounds which increase the age-resisting properties of rubber when incorporated therein and which do not discolor the rubber when exposed to sunlight and hence are particularly adapted for use in white and light colored rubber articles. Other and further objects are to provide a new composition of matter and to advance the art. Still other objects will appear hereinafter.

These objects are accomplished according to the following invention which comprises incorporating in rubber, salts of the complexes formed by the reaction of boric acid with ortho dihydroxy aromatic bodies. While the structure of these complexes may not be clearly understood, the resulting products have a well defined crystalline nature and composition. Such salts are described by Böeseken and his co-workers—J. Böeseken, Rec. Trav. Chim. 37 184 (1918); J. Meulenhoff, Rec. Trav. Chim. 44 150 (1925), and J. Böeseken and N. Vermaas, J. Phys. Chem. 35 1477 (1931).

The present invention is based upon our discovery that this class of compounds when incorporated in rubber greatly increases the age-resisting properties of the rubber and does not discolor the rubber upon exposure thereof to sunlight.

The term "ortho dihydroxy aromatic bodies" as used throughout the specification and claims is to be understood to mean organic compounds containing an aromatic nucleus such as naphthyl and phenyl with only two adjacent hydroxy groups carried by the nucleus but which nucleus may have other alkyl and aryl radicals substituted therein. Some of these ortho dihydroxy aromatic bodies which we have found to form compounds which are particularly satisfactory for our purposes are catechol, 1-methyl-3:4-dihydroxy benzene and 2:3-dihydroxy naphthalene. These bodies react with boric acid, generally in the ratio of two molecules of the aromatic body to one molecule of the boric acid, to form complexes which appear to be mono-basic acids in character and which will react with basic salt-forming elements or radicals to form salts. Among the salt-forming elements or radicals which we have found to be particularly satisfactory are zinc, sodium, potassium, ammonium, butylamine, dibutylamine, tributylamine, piperidine, pyridine, alpha-methyl-piperidine, aniline, 1-methyl-2:4-diamino benzene, beta-naphthylamine, diphenyl guanidine, and di-ortho-tolyl guanidine.

In order to illustrate the value of these compounds in rubber, rubber stocks were prepared containing di-ortho-tolyl guanidine as an accelerator and one part of the age-resistor to 100 parts of rubber. These stocks were vulcanized to a comparable state of cure and then aged in an oxygen bomb for 72 hours at an oxygen pressure of 300 pounds per square inch and at a temperature of 70° C. The results obtained for representative members of this class are shown in the following table:

| Age-resistor | Original tensile | Tensile after ageing |
|---|---|---|
| None | 2950 | Completely deteriorated after 48 hrs. |
| Potassium di catechol borate | 2900 | 2300 |
| Ammonium di catechol borate | 3350 | 2225 |
| Dibutylamine di catechol borate | 3350 | 2375 |
| Aniline di catechol borate | 3200 | 2500 |
| b-Naphthylamine di catechol borate | 3200 | 2400 |
| Piperidine di catechol borate | 3225 | 2600 |
| 1-Methyl-2:4-diamino benzene di catechol borate | 3350 | 2850 |
| Butylamine di catechol borate | 3100 | 2450 |
| Pyridine di catechol borate | 2900 | 2100 |
| Tributylamine di catechol borate | 3150 | 2275 |
| Diphenyl guanidine di catechol borate | 3400 | 2425 |
| Di-ortho tolyl guanidine di catechol borate | 2425 | 2025 |
| Alpha methyl piperidine di catechol borate | 3325 | 2025 |

From the results obtained as illustrated by the above table, it will be apparent that the compounds of this class, when incorporated in rubber, are very effective in retarding deterioration as judged by the common accelerated ageing tests. When vulcanized rubber containing a compound of this class is exposed to the fadeometer for 8 hours or to the direct rays of the sun for long periods of time, the rubber does not discolor. These compounds are equally effective when employed in rubber which is subsequently vulcanized with sulfur chloride.

While we have mentioned specifically certain salt-forming elements or radicals to be employed in the preparation of the salts of the boric acid complexes, it is understood that our invention is not to be limited to these specific salt-forming substances, as other salt-forming substances may be substituted therefor. Some of the other salt-forming substances which may be mentioned are the alkaline earth metals, barium, calcium, and strontium, and the organic bases in general, and particulary methylamine, propylamine, insopropylamine, ethanolamine, methyl aniline and dimethyl aniline.

Further, while we have disclosed the results obtained with various dicatetchol borates in the foregoing table, it is to be understood that other ortho-dihydroxy aromatic bodies may be substituted for the catechol.

We have illustrated the incorporation of one part of the age-resistor to 100 parts of rubber in a rubber stock, before vulcanization. However, it is to be understood that this proportion may be varied within a wide range depending upon the desire of the user and the nature of the rubber employed, and that the age-resistor may be incorporated into the rubber according to any of the other well known methods of incorporation.

While we have disclosed certain specific compounds and certain specific methods of employing the same, it is be understood that such specific compounds and methods are given merely by way of illustration and many modifications and changes therein will appear to those skilled in the art, without departing from the spirit of our invention. Accordingly, the scope of our invention is to be limited solely by the appended claims, construed as broadly as is permissible in view of the prior art.

We claim:

1. The method of increasing the age-resisting properties of rubber which comprises incorporating in the rubber a compound obtainable by reacting boric acid with an ortho dihydroxy aromatic body and a basic salt-forming substance.

2. The method of increasing the age-resisting properties of rubber which comprises incorporating in the rubber a compound obtainable by reacting boric acid with an ortho dihydroxy aromatic body and an alkaline reacting substance.

3. The method of increasing the age-resisting properties of rubber which comprises incorporating in the rubber a compound obtainable by reacting boric acid with an ortho dihydroxy aromatic body and an organic base.

4. The method of increasing the age-resisting properties of rubber which comprises incorporating in the rubber a compound obtainable by reacting boric acid with an ortho dihydroxy aromatic body of the group consisting of catechol, 1-methyl-3:4-dihydroxy benzene, 2:3-dihydroxy naphthalene and their homologues and with a basic salt-forming substance.

5. The method of increasing the age-resisting properties of rubber which comprises incorporating in the rubber a compound obtainable by reacting boric acid with an ortho dihydroxy aromatic body of the group consisting of catechol, 1-methyl-3:4-dihydroxy benzene, 2:3-dihydroxy naphthalene and their homologues and with an alkaline reacting substance.

6. The method of increasing the age-resisting properties of rubber which comprises incorporating in the rubber a compound obtainable by reacting boric acid with an ortho dihydroxy aromatic body of the group consisting of catechol, 1-methyl-3:4-dihydroxy benzene, 2:3-dihydroxy naphthalene and their homologues and with an organic base.

7. The method of increasing the age-resisting properties of rubber which comprises incorporating in the rubber a compound obtainable by reacting boric acid with a catechol and a basic salt-forming substance.

8. The method of increasing the age-resisting properties of rubber which comprises incorporating in the rubber a compound obtainable by reacting boric acid with a catechol and an organic base.

9. The method of increasing the age-resisting properties of rubber which comprises incorporating in the rubber a compound obtainable by reacting one molecule of boric acid with two molecules of an ortho dihydroxy aromatic body and with a basic salt-forming substance.

10. The method of increasing the age-resisting properties of rubber which comprises incorporating in the rubber a compound obtainable by reacting one molecule of boric acid with two molecules of an ortho dihydroxy aromatic body and with an organic base.

11. Rubber containing a small amount of a compound obtainable by reacting boric acid with an ortho dihydroxy aromatic body and a basic salt-forming substance.

12. Rubber containing a small amount of a compound obtainable by reacting boric acid with an ortho dihydroxy aromatic body and an alkaline reacting substance.

13. Rubber containing a small amount of a compound obtainable by reacting boric acid with an ortho dihydroxy aromatic body and an organic base.

14. Rubber containing a small amount of a compound obtainable by reacting boric acid with an ortho dihydroxy aromatic body of the group consisting of catechol, 1-methyl-3:4-dihydroxy benzene, 2:3-dihydroxy naphthalene and their homologues and with a basic salt-forming substance.

15. Rubber containing a small amount of a compound obtainable by reacting boric acid with an ortho dihydroxy aromatic body of the group consisting of catechol, 1-methyl-3:4-dihydroxy benzene, 2:3-dihydroxy naphthalene and their homologues and with an alkaline reacting substance.

16. Rubber containing a small amount of a compound obtainable by reacting boric acid with an ortho dihydroxy aromatic body of the group consisting of catechol, 1-methyl-3:4-dihydroxy benzene, 2:3-dihydroxy naphthalene and their homologues and with an organic base.

17. Rubber containing a small amount of a compound obtainable by reacting boric acid with a catechol and a basic salt-forming substance.

18. Rubber containing a small amount of a compound obtainable by reacting boric acid with a catechol and an organic base.

19. Rubber containing a small amount of a compound obtainable by reacting one molecule of boric acid with two molecules of an ortho dihydroxy aromatic body and with a basic salt-forming substance.

20. Rubber containing a small amount of a compound obtainable by reacting one molecule of boric acid with two molecules of an ortho dihydroxy aromatic body and with an organic base.

21. The method of increasing the age-resisting properties of rubber which comprises incorporating in the rubber a compound obtainable by reacting one mole of boric acid with two moles of catechol and then with di-ortho-tolyl guanidine.

22. Rubber having incorporated therein a small amount of a compound obtainable by reacting one mole of boric acid with two moles of catechol and then with di-ortho-tolyl guanidine.

23. The method of increasing the age-resisting properties of rubber which comprises incorporating in the rubber a compound obtainable by reacting one mole of boric acid with two moles of catechol and then with ammonia.

24. Rubber having incorporated therein a small amount of a compound obtainable by reacting one mole of boric acid with two moles of catechol and then with ammonia.

25. The method of increasing the age-resisting properties of rubber which comprises incorporating in the rubber a compound obtainable by reacting one mole of boric acid with two moles of catechol and then with piperidine.

26. Rubber having incorporated therein a small amount of a compound obtainable by reacting one mole of boric acid with two moles of catechol and then with piperidine.

In testimony whereof we affix our signatures.

IRA WILLIAMS.
ARTHUR MORRILL NEAL.

CERTIFICATE OF CORRECTION.

Patent No. 1,902,005.                                                March 21, 1933.

IRA WILLIAMS, ET AL.

It is hereby certified that error appears in the printed specification of the above numbered patent requiring correction as follows: Page 2, line 46, for "insopropylamine" read "isopropylamine"; and line 49, for "dicatetchol" read "dicatechol"; and that the said Letters Patent should be read with these corrections therein that the same may conform to the record of the case in the Patent Office.

Signed and sealed this 16th day of May, A. D. 1933.

M. J. Moore.

(Seal)                                          Acting Commissioner of Patents.